United States Patent Office 3,591,688
Patented July 6, 1971

3,591,688
METHOD OF PREVENTING OVULATION AND COMPOSITION THEREFOR
Robert C. Jones, Narberth, and Richard A. Edgren, Berwyn, Pa., assignors to American Home Products Corporation, New York, N.Y.
No Drawing. Continuation-in-part of application Ser. No. 818,121, Apr. 21, 1969, which is a continuation-in-part of application Ser. No. 767,823, Oct. 15, 1968. This application Aug. 22, 1969, Ser. No. 852,456
Int. Cl. A61k 17/06
U.S. Cl. 424—239                               20 Claims

ABSTRACT OF THE DISCLOSURE

Compositions comprising (a) a progestogen, specifically, a 3 - cyclopentyloxy-13-polycarbonalkyl-17α-ethynylgona-3,5-diene-17β-ol, or 17-acylate in admixture with (b) an estrogen, specifically, a 3-cyclopentyloxy-13-alkyl-17α-ethynylgona-1,3,5(10-trien-17β-ol or a $\Delta^7$-dehydro analog thereof are useful to prevent ovulation in warm-blooded ovulating vertebrates after oral administration. In one advantageous aspect, because of their prolonged duration of activity, the instant compositions may be administered in simplified regimens, e.g., at once-a-week intervals.

This application is a continuation-in-part of co-pending U.S. patent application Ser. No. 818,121, filed Apr. 21, 1969, now abandoned, which in turn is a continuation-in-part of copending U.S. patent application Ser. No. 767,823, filed Oct. 15, 1968, now abandoned.

This invention relates to a method for preventing ovulation in warm-blooded ovulating vertebrates, e.g., female animals, and to compositions therefor. More particularly it is concerned with the oral administration of selected novel progestagens, specifically, 3-cyclopentyloxy-13-polycarbonalkyl-17α-ethynylgona-3,5-dien-17β-ols, or 17-acylates, in admixture with selected estrogens, specifically, 3-cyclopentyloxy-13-alkyl-17α-ethynylgona - 1,3,5 - trien-17β-ols and the $\Delta^7$-dehydro analogs thereof, as a means to prevent the normal tendency of such vertebrate to ovulate.

BACKGROUND OF THE INVENTION

It is a matter of common knowledge and experience to orally administer estrogens/progestogens in admixture or sequentially to ovulating vertebrates to prevent ovulation [See Maxwell Roland et al., "Journal of Obstetrics and Gynecology," 31, 637 (1968)]. The desired objective in nearly all instances, following daily administration of unit dosages of such well-known progestagens as norethindrone or norethynodrel and such well-known estrogens as mestranol, is to inhibit the production of release of gonadotropins from the pituitary and to suspend ovulation. In this manner, in live-bearing species, a luteioid endometrium is induced and maintained while the composition is taken for the inhibition of ovulation, this is, prevention of conception. Well known also is the need to follow with great precision the established regimen of daily dosages, because failure rates appear to be closely related to the missing of unit dosages, i.e., tablets, during the treatment period [See Elsimor Continho, "Journal of Reproduction and Sterility," 16, 137 (1968)]. And this seems to be an especially critical problem with the sequentials (e.g., estrogen alone for 10–15 days, followed by progestagen plus estrogen for 5–11 days, in warm blooded vertebrates of the highest orders). Because the existing daily dosage regimens require extraordinary care to insure proper pill-takeng (administration) on the part of the subject (or administerer), it would be desirable to provide a wholly different approach [See Robert Greenblatt, "Fertility and Sterility," 18, 207 (1967)] and this is the primary objective of the instant invention. It has now surprisingly been found possible to administer a novel composition (which will be defined hereinafter) to warm blooded vertebrates and to achieve a biologically meaningful, long acting inhibition of ovulation. This effect is valuable when viewed against current regimens (See Roland and Continho, supra) in that it dispenses with the frequent (daily) administration of the prior art anovulatory compositions. It follows therefore that the use of the instant compositions will allow very simple regimens for oral contraception. For example, in vertebrates of the highest order, the initial tablet can be scheduled shortly after completion of menses—by way of illustration—on a Sunday, providing this does not go beyond day 7 of the usual 28 day cycle. The veterbrate then would be administered a unit dosage on the Sunday following the menses and on the subsequent 2 Sundays. Because of the surprisingly long duration of activity of the instant compositions, protection is excellent during about the next week and menses will occur during the second week following the final tablet. The menses should be complete, in due course, so that tablet administration would be initiated again on the fourth Sunday following the initial tablet. Thus, in this very simple regimen, the composition would be administered on the same day of the week, three weeks in a row, skipped the next week and initiated again the following week. For convenience of administration an inert tablet (placebo) may be included in a tablet sequence which will have the effect of a skipped administration and increase the ease of the administration regimen. In addition to permitting administration on a much simplified basis, the instant compositions are highly effective and their use is accompanied by a minimum of side effects.

DESCRIPTION OF THE INVENTION

These valuable objectives and all other advantages that would be apparent to those skilled in the art are readily achieved by practice of the instant invention which is, in essence: a method of preventing ovulation in a warm-blooded ovulating vertebrate which comprises the oral administration thereto of a composition comprising:
(a) a compound of the formula

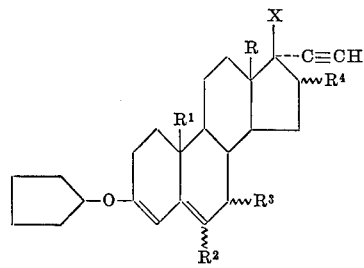

wherein

R is alkyl of from 2 to about 20 carbon atoms;
R¹, R², R³ and R⁴ are hydrogen or methyl;
X is OH or OCOR⁵ wherein R⁵ is alkyl of from about 1 to about 10 carbon atoms, cycloalkyl of from about 3 to about 6 carbon atoms or monocarbocyclic aryl (lower)alkyl, in admixture with (b) a compound of the formula

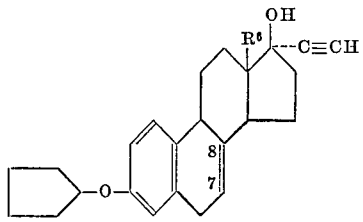

wherein R⁶ is alkyl of from about 1 to about 20 carbon atoms, and the broken line indicates a single bond or a double bond at $C_7$–$C_8$, the amount of said composition administered being at least sufficient to prevent ovulation.

Special mention is made of a number of valuable embodiments of the instant invention. These are:

A method as first above defined wherein said composition contains from about 0.015 part to about 2.5 parts by weight of active ingredient (b) per part by weight of active ingredient (a);

A method as first above defined wherein said composition is administered as a dosage unit comprising a major amount of a solid, oral, pharmacologically-acceptable carrier( from about 2 mg. to about 20 mg. of active ingredient (a), and from about 0.3 mg. to about 5 mg. of active ingredient (b);

A method as first above defined wherein, in active ingredient (a), R is ethyl, R¹, R², R³ and R⁴ are hydrogen and X is OH or OCOH₃; i.e., respectively compounds which are *dl*-3-cyclopentyloxy-13-ethyl-17α-ethynylgona-3,5-dien-17β-ol and the 17-acetate thereof;

A method as next above defined wherein said active ingredient (a) consists of the 17-acetate as the *d*-enantiomorph, substantially free of the corresponding *l*-enantiomorph; i.e., a compound which is *d*-3-cyclopentyloxy-13-ethyl-17α-ethynylgona-3,5-dien-17β-ol, acetate;

A method as first above defined wherein said active ingredient (a) is 3-cyclopentyloxy-13-ethyl-17α-ethynylgona-3,5-dien-17β-ol, heptanoate;

A method as first above defined wherein, in active ingredient (b), R⁶ is ethyl and $C_7$–$C_8$ is a carbon-to-carbon double bond; i.e., a compound which is *dl*-3-cyclopentyloxy - 13 - ethyl-17α-ethynylgona-1,3,5(10),7-tetraen-17β-ol;

A method as third above defined wherein, in active ingredient (a), R is ethyl, R¹, R², R³ and R⁴ are hydrogen and X is OH or OCOR⁵ wherein R⁵ is CH₃ or CH₂(CH₂)₄CH₃ and in active ingredient (b), R⁶ is ethyl and $C_7$–$C_8$ is a carbon-to-carbon double bond.

In another of its broad aspects, the instant invention contemplates valuable orally-active, ovulation-preventing compositions comprising (a) a compound of the formula

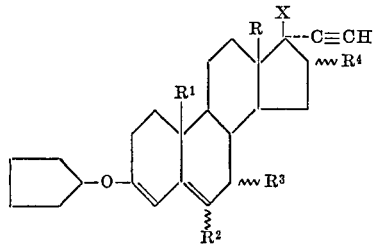

wherein

R is alkyl of from 2 to about 20 carbon atoms;
R¹, R², R³ and R⁴ are hydrogen or methyl; and X is OH or OCOR⁵, wherein R⁵ is alkyl of from about 1 to about 10 carbon atoms, cycloalkyl of from about 3 to above 6 carbon atoms or monocarbocyclic aryl (lower)-alkyl, in admixture with (b) a compound of the formula

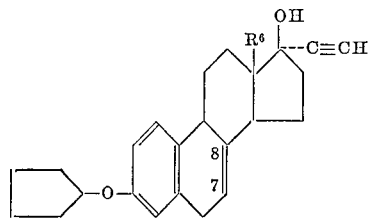

wherein R⁶ is alkyl of from about 1 to about 20 carbon atoms, and the broken line indicates a single bond or a double bond at $C_7$–$C_8$, and a solid, oral, pharmacologically-acceptable carrier, the amounts of active ingredients (a) and (b) in said composition being at least sufficient to impart orally-active, ovulation-preventing activity thereto.

Special mention is made of a number of important embodiments within this aspect. These are:

A composition as first above defined containing from about 0.015 part to about 2.5 parts by weight of active ingredient (b) per part by weight of active ingredient (a).

A composition as first above defined each unit dosage comprising from about 2 mg. to about 20 mg. of active ingredient (a), from about 0.3 g. to about 5 mg. of active ingredient (b) and a major amount of said solid, oral, pharmacologically-acceptable carrier.

ingredient (a), R is ethyl, R¹, R², R³ and R⁴ are hydrogen

A composition as first above defined wherein, in active and X is OH or OCOCH₃; i.e., respectively, compounds which are *dl*-3-cyclopentyloxy-13-ethyl-17α-ethynylgona-3,5-dien-17β-ol, and the 17-acetate thereof.

A composition as next above defined wherein said active ingredient (a) consists of the 17-acetate as the *d*-enantiomorph, substantially free of the corresponding *l*-enantiomorph; i.e., a compound which is *d*-3-cyclopentyloxy-13-ethyl-17α-ethynylgona-3,5-dien-17β-ol, acetate.

A composition as first above defined wherein said active ingredient (a) is 3-cyclopentyloxy-13-ethyl-17α-ethynylgona-3,5-dien-17β-ol, heptanoate.

A composition as first above defined wherein, in active ingredient (b), R⁶ is ethyl and $C_7$–$C_8$ is a carbon-to-carbon double bond; i.e., a compound which is *dl*-3-cyclopentyloxy - 13 - ethyl-17α-ethynylgona-1,3,5(10),7-tetraen-17β-ol.

A composition as third above defined wherein, active ingredient (a), R is ethyl, R¹, R², R³ and R⁴ are hydrogen and X is OH or OCOR⁵ wherein R⁵ is CH₃ or CH₂(CH₂)₄CH₃ and in active ingredient (b), R⁶ is ethyl and $C_7$–$C_8$ is carbon-to-carbon double bond.

When used herein and in the appended claims, the term "warm-blooded ovulating vertebrates" contemplates female animals and birds such as mice, rats, guinea pigs, rabbits, monkeys, gibbons, langurs, chickens, and the like and valuable domestic animals and birds, such as dogs, cats, rabbits, sheep, cattle, horses, chickens, turkeys and the like, of such as age that ovulation is feasible and normal. The term "preventing ovulation" contemplates a mechanism whereby the vertebate does not produce an egg because the release of pituitary gonadotrophic hormones has been inhibited. Merely by way of illustration, ovulation is prevented by administration of an estrogenic agent, e.g., *dl* - 3-cyclopentyloxy-13-ethyl-17α-ethynylgona-1,3,5 (10),7-tetraen-17β-ol. As will be illustrated hereinafter, the estrogenic effect of this compound is of moedrate (e.g., 8 days or so) duration and it is possible to prevent ovulation for several days with a single oral dose. In addition to preventing ovulation, the instant compositions include a progestogen to maintain a luteioid endometrium (in the live bearing species) which insures a precise and normal menstruation (in the highest vertebrate species) and which modifies the nature of the reproductive tract to such a degree as to provide a hostile environment for any sperm which might be present. Merely by way of illustration, these functions are performed by administration of a progestational agent, e.g., 3-cyclopentyloxy-13-ethyl-17α-ethynylgona-3,5-dien-17β-ol, or 17-acetate. As will also be illustrated hereinafter, the progestational effect of these compounds are of moderate length (e.g., 7 days or so) and it is possible to induce a luteioid endometrium and sperm-hostile environment and to maintain them for several days with a single oral dose. These objectives cannot be obtained with other orally-administrable progestogens known until now.

The term "solid, oral, pharmacologically-acceptable carrier" contemplates usual and customary solid substances employed to formulate unit dosages for pharmacological purposes. It also will include, in its broadest aspects, animal feedstuffs. To formulate unit dosages for administration according to this invention the active ingredients can be compounded into oral dosage forms, such as tablets, capsules and the like. This done by combining the active ingredients with conventional carriers, such as magnesium carbonate, magnesium stearate, talc, sugar, lactose, pectin, dextrin, starch, gelatin, tragacanth, methyl cellulose, sodium carboxymethyl cellulose, low melting wax, cocoa butter, and the like. Diluents, flavoring agents, solubilizers, lubricants, suspending agents, binders, tablet-disintegrating agents, and the like may be employed. The active ingredients can be formulated with an encapsulating material with or without other carriers. In all cases, the proportion of active ingredients in the said compositions will be at least sufficient to impart ovulation preventing activity thereto on oral administration. This will range upward from about 0.001% by weight of active ingredient (b) [the estrogen] in said composition. As is mentioned above the amount of active ingredients especially preferred for each unit dosage (tablet or capsule) is from about 2 to about 20 mg. of active ingredient (a) [although from about 0.25 to about 100 mg. can be used, if desired] and from about 0.3 to about 5 mg. of active ingredient (b) [although from about 0.005 to about 15 mg. can be used, if desired].

The dosages will depend on whether or not the administerer wishes to use conventional regimens [administer daily a composition comprising from about 0.25 to about 10 mg. of active ingredient (a) and from about 0.01 to about 1.0 mg. of active ingredient (b)] or to take advantage of the once-a-week regime made possible by this invention [administer at weekly intervals from about 2 to about 20 mg. of active ingredient (a) and from about 0.3 to about 5 mg. of active ingredient (b)]. These dosages are based on an average body weight of about 50 to 70 kg., and can be adjusted to the weight of the individual vertebrate.

The "active ingredients (a)" contemplated by this invention are progestogens, specifically, 3-cyclopentyloxy-13-polycarbonalkyl-17α-ethynylgona-3,5-dien-17β-ols, and 17-acylates, which can be prepared by procedures well within the capabilities of those skilled in the art. For example, the acylates can be obtained by enolacylating and acylating, in one step, the corresponding 13-polycarbonalkyl-17α-ethynylgon-4-en-3-on-17β-ols of H. Smith et al., J. Chem. Soc., 1964, 4472–4492, or corresponding materials optionally substituted at C–6, C–7, C–10 and C–16 with methyl groups, either with a reagent comprising acetic anhydride and aqueous perchloric acid in a non-polar, inert organic solvent, preferably ethyl acetate, or an anhydride in admixture with an acyl halide and an acid acceptor, and then carrying out an exchange reaction between the 3-enol acylate-17-acylate formed thereby and cyclopentyl alcohol to produce 17-acylated active ingredient (a). These procedures will be exemplified in detail hereinafter, but they also are described in the disclosure of the U.S. Patent application of H. Smith and R. P. Stein, entitled "3-Cyclopentyloxy-13-polycarbonalkyl-17α-ethynylgona-3,5-dien-17β-ol, acylates," Ser. No. 767,809, filed Oct. 15, 1968. The 3-cyclopentyloxy-13-polycarbonalkyl-17α-ethynylgona-3,5-dien-17β-ols can be obtained by reacting the corresponding 17-keto compounds with an ethynylating agent, such as an alkali metal acetylide, e.g., potassium or lithium acetylide or a Grignard reagent. It is useful to carry out the reaction in a diluent; for example, with potassium acetylide, liquid ammonia can be used; and with lithium acetylide, dimethyl sulfoxide can be employed. The 3-cyclopentyloxy-13-polycarbonalkylgano-3,5-dien-17-one starting materials can be obtained by briefly treating the corresponding 13-alkylgon-4-ene-3, 17-diones of U.K. Pat. No. 1,010,054, with acetic acid and perchloric acid in ethyl acetate at about 25° C. to obtain the corresponding 3-acetoxy-13-alkylgona-3,5-dien-17-ones, and treating these with cyclopentyl alcohol and p-toluene-sulfonic acid in refluxing heptane to give the 3-cylopentylenol ethers. These methods will be described in detailed procedures hereinafter.

The "active ingredients (b)" contemplated by this invention are estrogens, specifically, 3-cyclopentyloxy-13-alkyl-17α-ethynylgona-1,3,5(10)-trien-7β-ols and $^{7}\Delta$ dehydro analog thereof, which can be prepared by procedures well within the capibilities of those skilled in the art. For example, the corresponding 3-cyclopentyloxy-13-alkylgona-1,3,5(10)-trien-17-ones or $\Delta^7$ dehydro analogs thereof are prepared by reacting the corresponding 3-hydoxy compounds of H. Smith, loc. cit., and G. C. Buzby, R. P. Stein and H. Smith, Belgian Patent No. 700,232 (Aug. 31, 1967), respectively, with cyclopentyl halide (chloride or bromide) in the presence of a base, e.g., potassium hydroxide or sodium methoxide. These then, as will be exemplified in detail hereinafter, can be ethnylated by conventional procedures, e.g., in acetylene-saturated demthylacetamide with lithium acetylideethylenediamine or in acetylene-saturated dimethylsulfoxide with lithium acetylide-ethylenediamine. In addition, means are well known to permit partial etherification with cyclopentyl alcohol of the corresponding 17α-ethynyl gona-3,17-diols.

As is mentioned hereinabove, the instant active ingredients (a) and (b) possess, respectively, marked intrinsic progestational and estrogenic activities of increased duration, which are of particular value, especially after oral administration, because they permit regimens to be established for less frequent dosages than presently possible.

One pharmacological test in which progestational activity of prolonged duration was demonstrated was carried out as follows: The orally administered compound is subjected to a Clauberg assay and the progestational effects are determined 2 days, 5 days and 7 days post-administration. Compounds that maintain biologically meaningful progestational effects for at least several days are deemed to have a prolonged duration of activity. Immature female rabbits (800–1200 g.) are primed with estradiol-17β for 6 days. On the following day the primed rabbits then receive one administration of the test compound per os. The animals are sacrificed at 2, 5 and 7 days post-treatment. Progestational activity is assayed by histological evaluation of uterine glandular proliferation [Elton and Edgren, Endocrinology, 63, 464–472 (1958)]. In this test dl-3-cyclopentyloxy-13-ethyl-17α-ethynylgona-3,5-dien-17β-ol, acetate, an active ingredient (a) of this invention, administered at 1 mg. per animal had an assay value (McPhail Index) of 1.8 after 2 days; and 1.2 after 5 days (4 animals); and at 3 mg. per animal it had an assay value of 1.5 after 2 days; and 1.2 after 5 days (3 animals) and at 10 mg. per animal had an assay value of 1.2 after 2 days (3 animals); 2.9 after 5 days (4 animals); and 2.0 after 7 days (4 animals); showing that it maintained biologically meaningful progestational effects even 1 week after a single oral administration of 10 mg. per animal.

One pharmacological test in which estrogenic activity of prolonged duration was demonstrated was carried out as follows: Sprayed rats are administered 1 mg. of compounds on day 0 and vaginal smears are taken on the afternoon of successive days. The proportion of rats responding with cornified vaginal smears is increased by active compounds. Prolonged duration of activity is shown by compounds exhibiting a significantly significant ratio of positive smears at least several days from day 0. In this procedure, 3-cyclopentyloxy - 13 - ethyl-17α-ethynyl-gona-1,3,5(10),7-tetraen-17β-ol, an ingredient (b) of the instant invention, produced the following data:

| Days | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| Positive smears | 0 | 1 | *15 | *20 | *14 | *19 | *11 | 4 | *7 | *8 | 3 | 1 | 0 | 1 |
| Total smears | 20 | 20 | 20 | 20 | 20 | 20 | 20 | 20 | 20 | 20 | 20 | 20 | 20 | 20 |

* Statistically significant at $p \leq 0.05$.

Thus positive estrogenic effects were demonstrated for a period of 8 days (after a latent period).

The term "alkyl groups of from about 1 to 10 carbon atoms" when used herein includes straight and branched chain and alicyclic groups, illustrative members of which are methyl, ethyl, n-propyl, i-propyl, n-butyl, t-butyl, n-pentyl, n-hexyl, cyclopentyl, n-octyl, n-nonyl, n-decyl, and the like. "Alkyl of from 2 to about 20 carbon atoms" includes those as above defined but excludes, of course, the methyl group, and in addition includes n-undecyl, n-tetradecyl, n-octadecyl, n-eicosyl, branched chain isomers of these and the like. "Cycloalkyl of from about 3 to about 6 carbon atoms" includes cyclopropyl, cyclobutyl, cyclopentyl and cyclohexyl as well as cyclopentylmethyl and cyclopropylethyl. "Monocarboxylic aryl(lower)alkyl" contemplates alkyl groups of from about 1 to about 6 carbon atoms, mono-substituted by phenyl, such as benzyl, phenethyl, α-methylbenzyl and the like. Preferably, with respect to active ingredients (a), R is the ethyl group, $R^1$, $R^2$, $R^3$ and $R^4$ are hydrogen and X is OH or OCOCH$_3$. Preferably, with respect to active ingredients (b), $R^6$ is methyl or ethyl.

In the product of a total synthesis which has not included a suitable resolution stage the compounds used in this invention will be present as racemates. Using a convention approved by Fieser and Fieser, "Steroids," p. 336 (1959), compounds designated as the *d*-forms are the enantiomers corresponding in configuration at C–13 to that of the natural hormone estrone. The corresponding enantiomorphs are consequently designated the *l*-forms and the racemates the *dl*-forms. Racemates will be depicted by structural formulas which show only the enantiomorphs of the *d*-configuration.

The following procedures illustrate the preparation of active ingredients (a) and (b), respectively, employed in the instant methods and compositions.

PROCEDURE A

*dl*-3-cyclopentyloxy-13-ethyl-17α-ethynylgonit-3,5-dien-17β-ol, acetate (a) *dl*-13-ethyl - 17α - ethynylgona - 3,5 - dien-3,17β-diol, diacetate.—To a solution of acetic anhydride (48 ml.) and 70% perchloric acid (0.5 ml.) in ethyl acetate (400 ml.) add ethyl acetate to a total volume of 500 ml. then add *dl*-13-ethyl-17α-ethynyl 17β-hydroxygon-4-ene-3-one (10.0 g.), swirl and let stand at room temperature for 5 minutes. Pour the reaction into saturated sodium bicarbonate solution. Separate the organic layer, wash with sodium bicarbonate water, brine and dry over sodium sulfate. Filter, remove the solvent in vacuo then add methanol and pyridine (2 ml.) and boil for 10 minutes. Cool and remove the solvent in vacuo and crystallize the resulting oil from methanol. Filter to obtain 8.0 g. of title product, M.P. 162–164° C.

(b) *dl* - 3 - cyclopentyloxy - 13 - ethyl - 17α - ethynylgona - 3,5 - dien - 17β - ol, acetate.—Reflux at about 85° C. a mixture of *dl* - 13 - ethyl - 17α - ethylylgona-3,5-dien-3,17-β-diol, diacetate (10.00 g.), p-toluenesulfonic acid (0.50 g.), cyclopentyl alcohol (20 ml.) and heptane (500 ml.) into a water-separator for 20 hours. Cool, add pyridine (3 ml.) then filter and evaporate the solvent in vacuo. Dissolve the resulting oil in methanol, filter and evaporate in vacuo then pump the residue dry. Crystallize the resulting oil from methanol to obtain 5.31 g. of title product, M.P. 148–150° C. Obtain an analytical sample by recrystallization from methanol, M.P. 154–155° C.

$\lambda_{max.}^{EtOH}$ 243 mμ (ε 19,400)

*Analysis.*—Calcd. for $C_{28}H_{38}O_3$ (percent): requires C, 79.58; H, 9.06. Found (percent): C, 79.32; H, 8.77.

PROCEDURE B

*d*-3-cyclopentyloxy-13-ethyl-17α-ethynylgona-3,5-dien-17β-ol, acetate (a) *d* - 13 - ethyl - 17α - ethynylgona - 3,5 - dien-317β-diol, diacetate.—To a solution of acetic anhydride (65 ml.) and 70% perchloric acid (1 ml.) in ethyl acetate (800 ml.) add *d* - 13 - ethyl - 17α - ethynyl - 17β-hydroxygon-4-en-3-one (10.0 g.) swirl and let stand at room temperature for 3.5 minutes. Pour the reaction into saturated sodium bicarbonate solution. Separate the organic layer, wash with sodium bicarbonate, water, brine and dry over sodium sulfate. Filter, remove the solvent in vacuo then adfid methanol and pyridine (1 ml.) and boil for 10 minutes. Cool and remove the solvent in vacuo. Dissolve the residue in hot methanol and let stand to crystallize. Filter to obtain 7.30 g. of the pure title product, M.P. 158–161° C.; [a]$_D$—194° (c.=1%, dioxane), $\lambda_{max.}^{KBr}$ 3.08 and 5.75μ. $\lambda_{max.}^{EtOH}$ 234 mμ (ε 18,900)

*Analysis.*—Calcd. for $C_{25}H_{32}O_4$ (percent): C, 75.72; H, 8.13. Found (percent): C, 75.66; H, 7.90.

(b) *d* - 3 - cyclopentyloxy - 13 - ethyl - 17α - ethynylgona-3,5-dien-17β-ol, acetate.—Reflux a mixture of *d*-13-ethyl-17α-ethynylgona-3,5,17β-diol, diacetate (7.00 g.) p-toluenesulfonic acid (0.50 g.), cyclopentyl alcohol (30 ml.) and heptane (40 ml.) into a water separator for 20 hours. Cool, add pyridine (3 ml.) and evaporate the solvent in vacuo. Dissolve the resulting oil in methanol, filter and evaporate in vacuo then pump the residue dry. Crystallize the residue from methanol to get 1.83 g., M.P. 118–122° C. Treat the solid in hot ether with Nuchar charcoal, filter and remove the solvent in vacuo. Boil the residue with methanol and let stand to fully crystallize. Filter to get 1.50 g. of pure title product, M.P. 140–142° C.;

$\lambda_{max.}^{KBr}$ 3.06 and 5.75μ. $\lambda_{max.}^{EtOH}$ 243 mμ (ε 20,500); [α]$_D$—214° (c.—1.1%, dioxane)

*Analysis.*—Calcd. for $C_{28}H_{38}O_3$ (percent): C, 79.58; H, 9.06. Found (percent): C, 79.28; H, 8.89.

PROCEDURE C

*dl*-3-cyclopentyloxy-13-ethyl-17α-ethynylgona-3,5-dien-17β-ol,heptanoate (a) *dl* - 13 - ethyl - 17α-ethynylgona-3,5-dien-3,17β-diol,3 - acetate 17-heptanoate.—Dissolve *dl*-13-ethyl-17α-ethylnyl 17β-hydroxygon-4-en-3-one, heptanoate (8.7 g.) in ethyl acetate (800 ml.) which is 1 M in acetic anhydride and 10⁻³ M is perchloric acid. Allow to stand three minutes and wash with aqueous sodium bicarbonate. Remove the solvent in vacuo and triturate the residue with methanol to provide the title compound, 3.50 g. M.P. 105–108° C., $\lambda_{max.}^{KBr}$ 310, 5.70, 5.75, 6.0, 6.12μ

(b) *dl* - 3 - cyclopentyloxy - 13 - ethyl - 17α-ethynyl-gona-3,5-dien-17β-ol, heptanoate.—Reflux p-toluene sulfonic acid monohydrate (0.04 g.) in heptane (150 ml.) and cyclopentanol (5.0 ml.) into a Dean-Stark water separator for one hour. Add *dl* - 13 - ethyl-17α-ethynyl-gona - 3,5 - diene - 3,17β - diol - 3 - acetate - 17-heptanoate (1.0 g.) and reflux for 48 hours. Remove the solvent and pump the residue at 10⁻¹ mm. Hg for 2 hours. Recrystallize from isopropanol-methanol to provide the product, 0.435 g., M.P. 113–114° C., $\lambda_{max.}^{KBr}$ 3.11
5.77, 6.09, 6.44μ.

*Analysis.*—$C_{33}H_{48}O_3$ (percent): C, 80.44; H, 9.83. Found C, 80.34; H, 9.70.

PROCEDURE D

*dl*-3-cyclopentyloxy-13-ethyl-17α-ethynylgona-3,5-dien-17β-ol (a) *dl* - 13 - ethyl - 3 - hydroxygona - 3,5 - dien - 17-one, acetate.—To a solution of acetic anhydride (25 ml.) and 70% perchloric acid (0.3 ml.) in ethyl acetate (250 ml.) add *dl*-13-ethylgon-4-ene-3,17-dione (5.0 g. British Patent No. 1,010,054, Example 3), swirl and let stand at room temperature for 3 minutes. Quench the reaction with saturated sodium bicarbonate solution then wash and dry the organic layer. Remove the solvent in vacuo, add methanol and pyridine (½ ml.) to the residue then boil for 10 minutes on the steam bath. Cool, remove the solvents in vacuo and pump the residue to dryness. Triturate the residue with hexane and filter to obtain 4.54 g. of crude product. Treat the solid in methylene chloride with decolorizing charcoal, filter and remove the methylene chloride in vacuo. Crystallize the resulting oil from absolute ethanol to obtain 2.80 g. of pure title product, M.P. 145–148° C.;

$\lambda_{max.}^{KBr}$ 5.67 and 5.75μ

*Analysis.*—Calcd. for $C_{21}H_{28}O_3$ (percent): C, 76.79; H, 8.59. Found (percent) C, 76.64 H, 8.71.

(b) *dl* - 3 - cyclopentyloxy - 13 - ethylgona - 3,5 - dien-17-one.—Reflux a mixture of cyclopentanol (15 ml.), p-toluenesulfonic acid (250 mg.) and heptane (250 ml.) into a water separator for 1 hour then add *dl*-13-ethyl-3-hydroxygona-3,5-dien-17-one, acetate (3.00 g.) and continue refluxing into the water separator for 16 hours. Replace the water-separator with a fresh one containing pellets of sodium hydroxide and reflux for 7 hours. Again replace the water separator with a fresh one and reflux a further 16 hours. Cool, add pyridine (3 ml.), filter and evaporate the solvent in vacuo. Pump the residue dry, triturate wtih cold methanol and filter to obtain 2.60 g. of crude product. Dissolve the solid in ethertetrahydrofuran (THF) containing several drops of pyridine, treat with decolorizing charcoal and filter. Remove the solvent in vacuo and crystallize the residue from methanol. Filter then dissolve the solid in a large volume of hot methanol, filter and let stand to deposit 1.26 g. of title product, M.P. 141–143° C. Finally, dissolve the solid in ether, add hexane and boil to remove the ether. Let stand to deposit 0.69 g. of pure title product as flat white prisms, M.P. 141–143° C.;

$\lambda_{max.}^{KBr}$ 5.77μ. $\lambda_{max.}^{EtOH}$ 243 mμ (ε 20,200)

*Analysis.*—Calcd. for $C_{24}H_{34}O_2$ (percent): C, 81.31; H, 9.67. Found (percent): C, 81.47; H, 9.40.

(c) *dl* - 3 - cyclopentyloxy - 13 - ethyl - 17α - ethynyl-gona-3,5-dien-17β-ol.—Bubble purified acetylene gas through a solution of *dl*-3-cyclopentyloxy-13-ethylgona-3,5-dien-17-one (2.00 g.) in dry dimethylsulfoxide (DMSO), (150 mg.) for 45 minutes then add lithium acetylide-ethylene diamine (1.00 g.) and stir under an atmosphere of acetylene for 2 hours at room temperature. Again add lithium acetylide-ethylenediamine (1.00 g.), stir for 2 hours then pour the reaction into ice-water. Extract the mixture with ether, wash, dry and evaporate the extract in vacuo. Dissolve the resulting oil in hexane and pass the solution through a short column of fluosilicate. Remove the hexane in vacuo, then dissolve the residue in ether and treat with decolorizing charcoal. Filter and remove the ether in vacuo and pump the residue under vacuum to complete dryness to get 1.00 g. of the title product;

$\lambda_{max.}^{KBr}$ 2.95 and 3.07μ

PROCEDURE E (*dl*)-3-cyclopentyloxy-13-ethyl-17α-ethynylgona-1,3,5(10),7-tetraen-17β-ol Dissolve (±)-3-cyclopentyloxy-13-ethylgona-1,3,5(10), 7-tetraen-17-one (Belgian Pat. No. 700,232, Aug. 31, 1967, Example 101, 3.00 g.) in dimethylacetamide (75 ml.) and saturate the solution with acetylene. Add lithium acetylide-ethylenediamine (2.0 g.) and stir the reaction under acetylene overnight at room temperature. Pour the reaction into water, wash and dry the extract, filter and evaporate the solvent in vacuo. Crystallize the residue from benzene-hexane to obtain the title product.

PROCEDURE F (*dl*)-3-cyclopentyloxy-13-ethyl-17α-ethynylgona 1,3,5(10),7-tetraen-17β-ol (Alternative Procedure)

Dissolve (±) - 3 - cyclopentyloxy - 13 - ethylgona - 1,3,5(10),7-tetraen-17-one (1.45 g.) in dimethylsulfoxide (75 ml.) and saturate the solution with purified acetylene. Add lithium acetylide ethylenediamine (0.90 g.) and stir the reaction under acetylene for 1½ hours at room temperature. Pour the reaction onto ice, extract with ethyl acetate-ether (1:1) and wash, dry and evaporate the extract. Dissolve the residue in warm hexane, and chromatograph the solution on a column of fluosilicate XXS. Elute the product with benzene, remove the solvent in vacuo. Treat a methylene chloride solution of the residue with Nuchar charcoal, filter through super cel and remove the solvent in vacuo to obtain the product as a white glass (1.33 g.);

$\lambda_{max.}^{KBr}$ 2.95 and 3.10μ

*Analysis.*—Calcd. for $C_{26}H_{32}O_2$ (percent): C, 82.93; H, 8.57. Found (percent): C, 82.56; H, 8.40.

*d* - 3 - cyclopentyloxy-17α-ethynylestra - 1,3,5(10),7-tetraen-17β-ol is obtained by entirely analogous procedures (Belgian Pat. 700,232, Example 105).

The corresponding 3 - cyclopentyloxy - 13 - alkyl - 17α-ethynylgona-1,3,5(10)-trien-17β-ols are obtained from the corresponding 17-ones of J. Chem. Soc., 1963, 5072–5094 and ibid., 1964, 4472–4492, by entirely analogous procedures. In this manner there are provided 17α-ethynylestradiol 3-cyclopentyl ether and 3-cyclopentyl-oxy-13-ethyl-17α-ethynylgona-1,3,5(10)-trien-17β-ol.

DESCRIPTION OF THE PREFERRED EMBODIMENTS

The following examples illustrate the preparation of compositions of this invention. They are not to be construed to limit the scope thereof in any manner whatsoever.

EXAMPLE 1

A tablet for use in the prevention of ovulation is prepared from the following ingredients:

|  | Mg. |
|---|---|
| dl - 3 - cyclopentyloxy - 13 - ethyl-17α-ethynylgona-3,5-dien-17β-ol, acetate | 5 |
| dl - 3 - cyclopentyloxy - 13 - ethyl-17α-ethynylgona-1,3,5(10),7-tetraen-17β-ol | 1 |
| Carboxymethylcellulose (400 cps.) | 15 |
| Lactose powder | 25 |
| Redried corn starch | 25 |
| Magnesium stearate powder | 4 |
| Calcium silicate powder, q.s. | |
|  | 200 |

The tablet is prepared by dissolving the steroids in benzene, mixing the solution with starch, drying the mix in a current of air, adding the remaining ingredients, mixing and compressing into slugs. The slugs are regranulated and compressed into tablets, each containing 5 mg. of the progestagen and 1 mg. of the estrogen.

EXAMPLE 2

Tablets are prepared having the same composition as in Example 1, except that an equal weight, respectively, of the d-enantiomorph of the progestogen, d-3-cyclopentyloxy - 13 - ethyl - 17α-ethynylgona-3,5-dien-17β-ol, acetate and of the progestogen, dl-3-cyclopentyloxy-13-ethyl-17α-ethynylgona-3,5-dien-17β-ol, are substituted for the dl-racemate of the 17-acetate. The tablets are prepared by dissolving the steroids in benzene, mixing the solution with the lactose powder and drying the mix in a current of air, then adding the carboxymethylcellulose and half the starch. With the powder thus obtained is mixed starch paste prepared from the remainder of the starch, the mixture is wet-granulated, the granules dried, the stearate added and the composition compressed into tablets.

EXAMPLE 3

A capsule for use orally to prevent ovulation contains, in encapsulating gelatin, the following ingredients:

|  | Mg. |
|---|---|
| dl - 3 - cyclopentyloxy-13-ethyl-17α-ethynylgona-3,5-dien-17β-ol, acetate | 5 |
| dl - 3 - cyclopentyloxy - 13 - ethyl-17α-ethynylgona-1,3,5(10),7-tetraen-17β-ol | 1 |
| Finely divided silica lubricant | 5 |
| Magnesium stearate powder | 5 |
| Powdered corn starch | 113 |
| Lactose powder, q.s. | 113 |
|  | 245 |

EXAMPLE 4

Formulations for prevention of ovulation are prepared in tablet form consisting of the following ingredients:

|  | Milligrams | | | | | | |
|---|---|---|---|---|---|---|---|
| dl-3-cyclopentyloxy-13-ethyl-17β-ethynyl-gona-3,5-dien-17α-ol, acetate | 5 | 9.85 | 2.5 | 2. | 2.0 | 20. | 20.0 |
| dl-3-cyclopentyloxy-13-ethyl-17α-ethynyl-gona-1,3,5(10)-trien-17β-ol | 0.075 | 0.15 | 1.0 | 0.3 | 5 | 0. | 5.0 |
| microcrystalline cellulose, N.F. | 20.0 | 20.0 | 20.0 | 20.0 | 20.0 | 20.0 | 20.0 |
| Magnesium stearate, U.S.P. | 0.22 | 0.22 | 0.22 | 0.22 | 22 | 0.22 | 0.22 |
| Lactose, U.S.P., q.s. ad | 100.0 | 100.0 | 100.0 | 100.0 | 100.0 | 100.0 | 100.0 |

EXAMPLE 5

Tablets for preventing ovulation are formulated and prepared according to Example 1, substituting for dl-3-cyclopentyloxy - 13 - ethyl-17α-ethynylgona-3,5-dien-17β-ol, acetate, respectively, an equivalent amount of the corresponding 17β-ol and of dl-3-cyclopentyloxy-13-ethyl-17α-ethynylgona-3,5-dien-17β-ol, heptanoate, and for the dl - 3 - cyclopentyloxy - 13-ethyl-17α-ethynylgona-1,3,5-(10),7 - tetraen - 17β-ol, respectively, equivalent amounts of d-3-cyclopentyloxy-17α-ethynylestra-1,3,5(10,7-tetraen-17β-ol; 17α-ethynylestradiol-3-cyclopentyl ether; and 3-cyclopentyloxy - 13 - ethyl - 17α-ethynylgona-1,3,5(10)-trien-17β-ol.

We claim:

1. A method of producing biologically meaningful estrogenic and progestational effects of at least a week's duration from a single oral dose and thereby preventing ovulation in a warm-blooded ovulating female vertebrate which comprises the oral administration thereto of a composition comprising:

(a) An amount progestationally effective for at least seven days duration of a compound of the formula

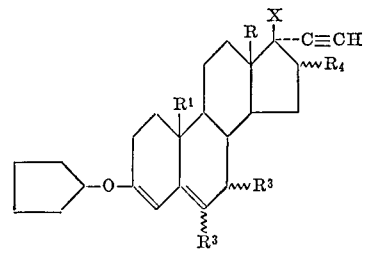

where R is alkyl of from 2 to about 20 carbon atoms; $R^1$, $R^2$, $R^3$ and $R^4$ are hydrogen or methyl; and X is OH or $OCOR^5$ wherein $R^5$ is alkyl of from 1 to about 10 carbon atoms, cycloalkyl of from about 3 to about 6 carbon atoms or monocarboxylic aryl (lower alkyl), in admixture with (b) an amount estrogenically effective for at least seven days duration of a compound of the formula

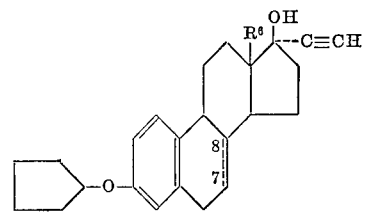

wherein $R^6$ is alkyl of from about 1 to about 20 carbon atoms, and the broken line indicates a single bond or a double bond at $C_7$–$C_8$.

2. A method as defined in claim 1 wherein said composition contains from about 0.015 parts to about 2.5 parts by weight of active ingredient (b) per part by weight of active ingredient (a).

3. A method as defined in claim 1 wherein said composition is administered as a dosage unit comprising a major amount of a solid, oral, pharmacologically-acceptabel carrier, from about 2 mg. to about 20 mg. of active ingredient (a), and from about 0.3 mg. to about 5 mg. of active ingredient (b).

4. A method as defined in claim 1 wherein, in active ingredient (a), R is ethyl, $R^1$, $R^2$, $R^3$ and $R^4$ are hydrogen and X is OH or $OCOCH_3$.

5. A method as defined in claim 1 wherein said active ingredient (a) is 3-cyclopentyloxy-13-ethyl-17α-ethynyl-gona-3,5-dien-17β-ol, acetate.

6. A method as defined in claim 5 wherein said active ingredient (a) consists of the d-enantiomorph, substantially free of the corresponding l-enantiomorph.

7. A method as defined in claim 1 wherein said active ingredient (a) is 3-cyclopentyloxy-13-ethyl-17α-ethynyl-gona-3,5-dien-17β-ol.

8. A method as defined in claim 1 wherein said active ingredient (a) is 3-cyclopentyloxy-13-ethyl-17α-ethynyl-gona-3,5-dien-17β-ol, heptanoate.

9. A method as defined in claim 1, wherein, in active ingredient (b), $R^6$ is ethyl and $C_7$–$C_8$ is a carbon-to-carbon double bond.

10. A method as defined in claim 3 wherein, in active ingredient (a), R is ethyl, $R^1$, $R^2$, $R^3$ and $R^4$ are hydrogen and X is OH or $OCOR^5$ wherein $R^5$ is $CH_3$ or $$CH_2(CH_2)_4CH_3$$

and in active ingrdeient (b), $R^6$ is ethyl and $C_7$–$C_8$ is a carbon-to-carbon double bond.

11. An orally active estrogenic and progestational effect-producing, and ovulation-preventing, composition comprising
(a) An amount progestationally effective for at least seven days duration of a compound of the formula

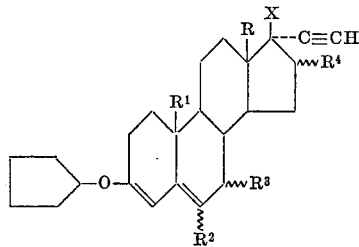

wherein R is alkyl of from 2 to about 20 carbon atoms; $R^1$, $R^2$, $R^3$ and $R^4$ are hydrogen or methyl; and X is OH or $OCOR^5$ wherein $R^5$ is alkyl of from about 1 to about 10 carbon atoms, cycloalkyl of from about 3 to about 6 carbon atoms or monocarbocyclic aryl (lower) alkyl, in admixture with
(b) an amount estrogenically effective for at least seven days duration of a compound of the formula

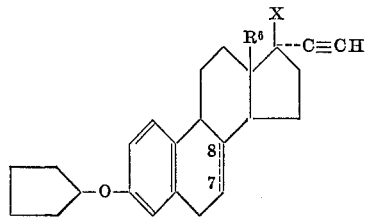

wherein $R^6$ is alkyl of from about 1 to about 20 carbon atoms, and the broken line indicates a single bond or a double bond at $C_7$–$C_8$ and a solid, oral, pharmacologically-acceptable carrier.

12. A composition as defined in claim 11 containing from about 0.015 part to about 2.5 parts by weight of active ingredient (b) per part by weight of active ingredient (a).

13. A composition as defined in claim 11 each unit dosage comprising from about 2 mg. to about 20 mg. of active ingredient (a), from about 0.3 mg. to about 5 mg. of active ingredient (b) and a major amount of said solid, oral, pharmacologically-acceptable carrier.

14. A composition as defined in claim 11 wherein, in active ingredient (a), R is ethyl, $R^1$, $R^2$, $R^3$ and $R^4$ are hydrogen and X is OH or $OCOCH_3$.

15. A composition as defined in claim 11 wherein said active ingredient (a) is 3-cyclopentyloxy-13-ethyl-17α-ethynylgona-3,5-dien-17β-ol, acetate.

16. A composition as defined in claim 15 wherein said active ingredient (a) consists of the *d*-enantiomorph, substantially free of the corresponding *l*-enantiomorph.

17. A composition as defined in claim 11 wherein said active ingredient (a) is 3-cyclopentyloxy-13-ethyl-17α-ethynylgona-3,5-dien-17β-ol.

18. A composition as defined in claim 11 wherein said active ingredient (a) is 3-cyclopentyloxy-13-ethyl-17α-ethynylgona-3,5-dien-17β-ol, heptanoate.

19. A composition as defined in claim 11 wherein, in active ingredient (b), $R^6$ is ethyl and $C_7$–$C_8$ is a carbon-to carbon double bond.

20. A composition as defined in claim 13 wherein, in active ingredient (a), R is ethyl, $R^1$, $R^2$, $R^3$ and $R^4$ are hydrogen and X is OH or $OCOR^5$ wherein $R^5$ is $CH_3$ or $CH_2(CH_2)_4CH_3$ and in active ingredient (b) $R^6$ is ethyl and $C_7$–$C_8$ is a carbon-to-carbon double bond.

References Cited

UNITED STATES PATENTS

| | | | |
|---|---|---|---|
| 3,019,241 | 1/1962 | Erocoli | 260—397.4 |
| 3,053,735 | 9/1962 | Ercoli | 424—243X |
| 3,423,433 | 1/1969 | Westerhof et al. | 260—397.3 |
| 3,471,531 | 10/1969 | Hughes et al. | 260—397.5 |
| 3,409,721 | 11/1968 | Applezweig | 424—239 |
| 3,502,772 | 3/1970 | Ijzerman | 424—239 |

SHEP K. ROSE, Primary Examiner

U.S. Cl. X.R.

424—243